(No Model.)

N. ROGGY.
CULTIVATOR.

No. 350,506.  Patented Oct. 12, 1886.

Witnesses
Jos. A. Ryan
W. R. Davis

Inventor
Nicholas Roggy
By his Attorneys
Manahan & Ward

UNITED STATES PATENT OFFICE.

NICHOLAS ROGGY, OF WALNUT, ILLINOIS.

CULTIVATOR.

SPECIFICATION forming part of Letters Patent No. 350,506, dated October 12, 1886.

Application filed June 29, 1886. Serial No. 206,649. (No model.)

*To all whom it may concern:*

Be it known that I, NICHOLAS ROGGY, a citizen of the United States, residing at Walnut, in the county of Bureau and State of Illinois, have invented certain new and useful Improvements in Corn-Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to corn-cultivators and pertains more especially to the class of pulverizers.

With the ordinary shovel-cultivators, which do their work by tearing up the ground and covering weeds, the objection is that the shovels, in order to throw a sufficient quantity of dirt to cover up weeds at their sides, have to be run deep, and this running deep tears off the lateral roots of the corn, and in check-rowed corn the result is that such roots are torn off on all sides of the hill. Some shallow-running devices, termed "pulverizers," have been introduced, but thus far they have been too clumsy as to lateral guidance to be used in crooked cross-rows, and most of them do not permit of lateral or vertical movement of the sections independently, for the purpose of guidance or self-adjustment to the inequality of the ground.

In my invention I have obtained an implement which, by the use of forward cutting-blades running under the ground, destroys the weeds by cutting them off, and by the use of small shovels or pulverizers following such blades the surface of the earth is broken up and the weeds torn down, and as this takes place above the lateral roots of the corn such roots are not disturbed.

I have five of my machines now running, and speak from practical knowledge.

My machine is made of two counterparts, so as to straddle the row, and I do not deem it necessary to show or describe more than one section thereof.

Figure 1:
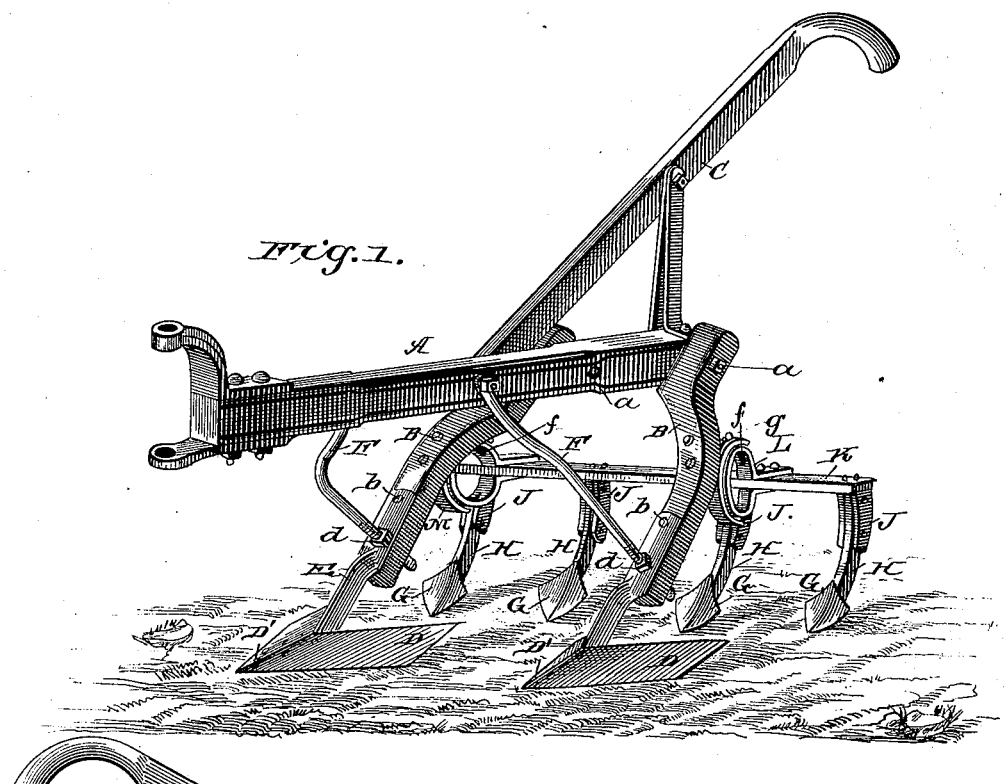
Figure 2:
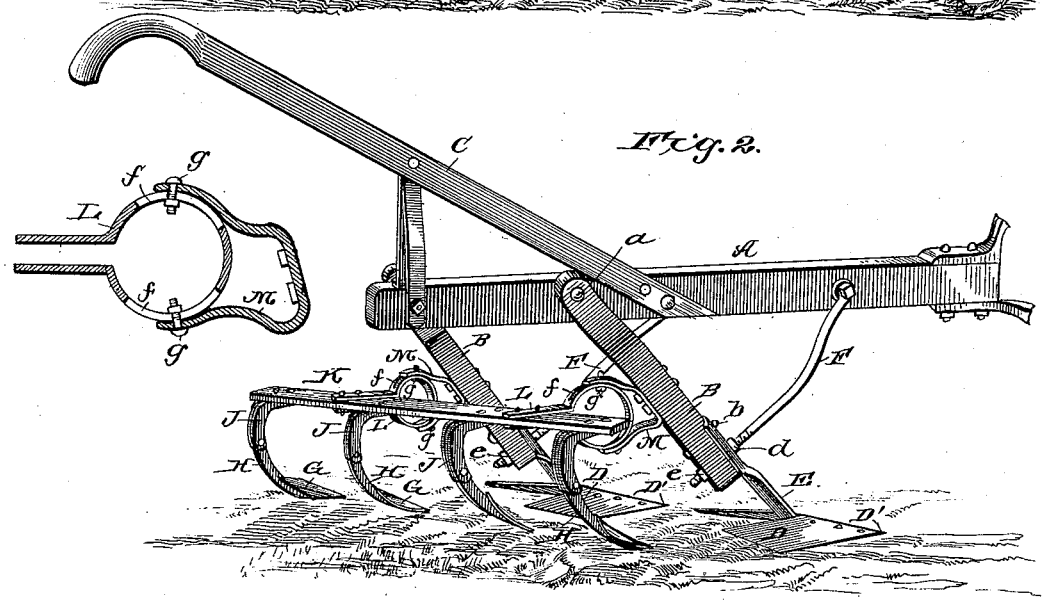

In the drawings, Figure 1 is a front perspective of a machine embodying my invention. Fig. 2 is a partial side elevation exhibiting a mode of attaching the pulverizer to the cross-brace, and also the knife-standard.

A is the beam, attached adjustably in any suitable way to the axle of a corn-cultivator.

B B are the knife-standards, pivotally attached at their upper ends to the beam A by means of a transverse bolt, *a*.

C is the usual handle.

D D are knives constructed of two steel plates placed together, so as to form a point in front and rearwardly-diverging cutting-edges. I prefer to form the knife D of two plates because in case of breakage the broken part can be easily replaced, and also the front junction of the plates D', which form the knives D, can be formed into a sharper angle than if the entire knife D were forged from one piece. The knives D are run nearly flat, being slightly raised to the rear, so that the friction of the dirt will be only on the upper side, and will therefore scour, and also that said knives may have a slight draw downward.

E is a narrow metal stem, having its lower end flattened and bent forward into a heart-like shape, and to the upper side of this flat portion of the stem E the plates D' are riveted, so that the upper surface of said plates shall be uniform and smooth, and offer no obstruction to the passage of the earth. The upper end of the stem E is fastened to the lower end of the standard B by means of an upper bolt, *b*, and the diagonal brace F is fastened to the beam A, and its lower or rear end is passed through the stem E and standard B, and is provided with a nut, *d*, above said stem, and a nut, *e*, below such standard. The nuts *d* and *e* operate on corresponding threads on the brace F, and thus the angle of the standard B is changed with reference to the beam A to regulate the draw of the knives in earth of variant degrees of hardness.

G G G G are four diamond-shaped small shovels, attached, respectively, to a stem, H, which latter is pivoted in a draft-iron, J, and provided therein with the usual break-pin. The irons J are all rigidly fastened to the cross-bar K. The cross-bar K is attached to the standard B as follows, to permit of the adjustment of the shovels G to the changes of angle aforesaid of the standard B.

L is a clip bent double and having its two open rear ends bolted or riveted to the bar K, and its central portion formed into a circle and projected forward.

M is a draft-grip, bolted at its center against the rear of the standard B, and with one of its rearwardly-extending ends resting on the top of the clip L, and its outer end resting against the lower side of said clip. Longitudinal slots $f$ are formed in the clip L, where the ends of the grip M lie against said clip, and short bolts $g$ are passed through said grip and slot. By loosening the bolts $g$, the clip L can be adjusted to the grip M, the bolts $g$ moving in slots $f$, and thus the small shovels G given any angle desired. The knives D are run entirely below the surface of the ground, the narrow stem E permitting the passage of the earth on each side of it, whereby said knives do not go deep enough to disturb the lateral roots of the corn, and by reason of such knives throwing no dirt toward the corn they can be run very close to the latter. The sharp front ends of the knives D either penetrate obstacles or move them gradually to one side.

In my machine each section can be easily moved laterally or adapt itself independently to the inequalities of the ground.

My machine is adapted to be attached to the axle of any cultivator.

What I claim as my invention, and desire to secure by Letters Patent of the United States, is—

1. In a cultivator, the combination, with the beam and standards, of the horizontal knives D D, arranged in pairs to run beneath the surface, the pulverizers G on frame J K, connected to and vertically adjustable on said standards by the clip L and grip M, substantially as shown and described.

2. The combination, with a cultivator, of the pulverizers G, clip L, provided with slots $f$, grip M, attached to standard B, and bolts $g$, whereby the gang of pulverizers are rendered adjustable in relation to the standard B, substantially as shown, and for the purpose described.

In testimony whereof I affix my signature in presence of two witnesses.

NICHOLAS ROGGY.

Witnesses:
ISAAC KELLEY,
MOSES DILLON.